United States Patent [19]
Karls et al.

[11] Patent Number: 5,244,348
[45] Date of Patent: Sep. 14, 1993

[54] PROPELLER DRIVE SLEEVE

[75] Inventors: Michael A. Karls, Hilbert; Daniel R. Lindgren, Fond du Lac, both of Wis.

[73] Assignee: Brunswick Corporation, Skokie, Ill.

[21] Appl. No.: 809,938

[22] Filed: Dec. 18, 1991

[51] Int. Cl.⁵ .............................................. F01D 5/30
[52] U.S. Cl. ............................ 416/204 R; 416/93 A; 416/134 R; 464/89; 464/180
[58] Field of Search .................... 416/204 R, 134 R, 2, 416/169 R, 93 R, 93 A; 464/89, 180

[56] References Cited

U.S. PATENT DOCUMENTS

| | | |
|---|---|---|
| 2,125,270 | 8/1938 | Conover . |
| 2,164,485 | 7/1939 | Yantis . |
| 2,633,923 | 7/1953 | Hartz . |
| 2,948,252 | 8/1960 | Alexandria, Jr. ............... 416/93 A |
| 2,974,502 | 3/1961 | Radcliffe ........................... 464/89 |
| 3,230,739 | 1/1966 | Stewart . |
| 3,279,415 | 10/1966 | Kiekhaefer .................... 416/93 A |
| 3,307,634 | 3/1967 | Bihlmire . |
| 3,321,024 | 5/1967 | Marconi, Jr. . |
| 3,477,794 | 11/1969 | Abbott et al. .................. 464/89 |
| 3,567,334 | 3/1971 | Lorenz ........................ 416/134 R |
| 3,748,061 | 7/1973 | Henrich ........................... 416/93 |
| 4,033,020 | 7/1977 | Hudgens ........................ 464/89 |
| 4,317,655 | 3/1982 | Schiek ........................... 440/78 |
| 4,338,064 | 7/1982 | Carmel ....................... 416/134 R |
| 4,452,591 | 6/1984 | Fishbaugh et al. ............. 464/89 |
| 4,566,855 | 1/1986 | Costabile et al. ........... 416/134 R |
| 4,642,057 | 2/1987 | Frazzell et al. ................ 440/52 |
| 4,667,530 | 5/1987 | Mettler et al. ................. 464/89 |
| 4,701,151 | 10/1987 | Uehara ...................... 416/134 R |
| 4,826,404 | 5/1989 | Zwicky ........................ 416/93 A |
| 4,842,483 | 6/1989 | Geary ......................... 416/93 A |
| 5,022,875 | 6/1991 | Karls ............................ 440/49 |

FOREIGN PATENT DOCUMENTS

| | | | |
|---|---|---|---|
| 664033 | 5/1963 | Canada ......................... | 416/134 |
| 0360639 | 10/1989 | European Pat. Off. . | |
| 528068 | 11/1921 | France .......................... | 416/134 |
| 441009 | 8/1988 | U.S.S.R. ......................... | 464/89 |
| 704497 | 2/1954 | United Kingdom ............ | 416/134 |

*Primary Examiner*—John T. Kwon
*Attorney, Agent, or Firm*—Andrus, Sceales, Starke & Sawall

[57] ABSTRACT

A shock absorbing drive sleeve (50) is provided by a molded plastic member directly mounting the propeller hub (14) to the propeller shaft (22). The sleeve has a rearward inner diameter portion (52) engaging the propeller shaft in splined relation, and a forward inner diameter portion (56) spaced radially outwardly of and disengaged from the propeller shaft. The drive sleeve has a rearward outer diameter portion (58), and a forward outer diameter portion (60) engaging the propeller hub. The drive sleeve and the propeller hub are tapered relative to each other such that a forward outer diameter portion (60) of the drive sleeve snugly engages the propeller hub, and a rearward outer diameter portion (58) is spaced slightly radially inwardly of the hub by a small gap (62) and may partially rotate relative to the propeller hub in response to rotation of the propeller shaft drivingly engaging the rearward inner diameter portion. When the propeller strikes an object, the shock is absorbed by torsional twisting of the drive sleeve wherein the rearward inner diameter portion and the rearward outer diameter portion continue to rotate to a further rotated position than the forward outer diameter portion, whereafter the splined teeth of the rearward inner diameter portion shear.

6 Claims, 3 Drawing Sheets

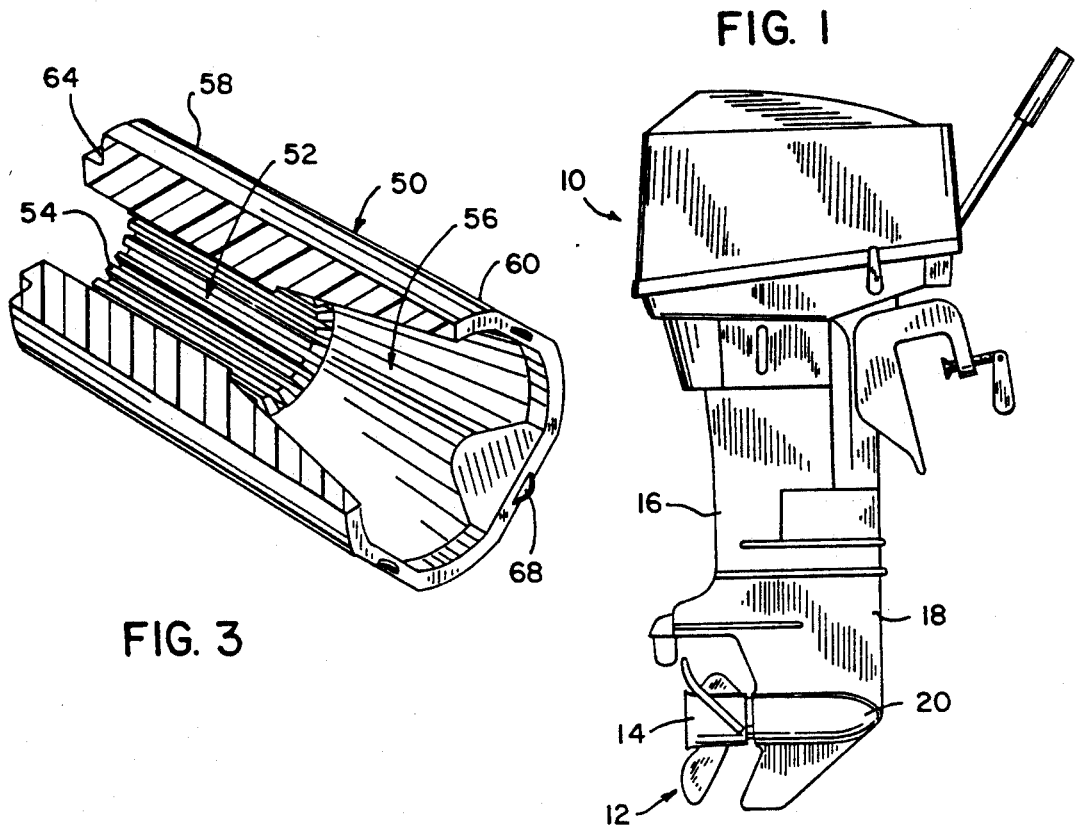
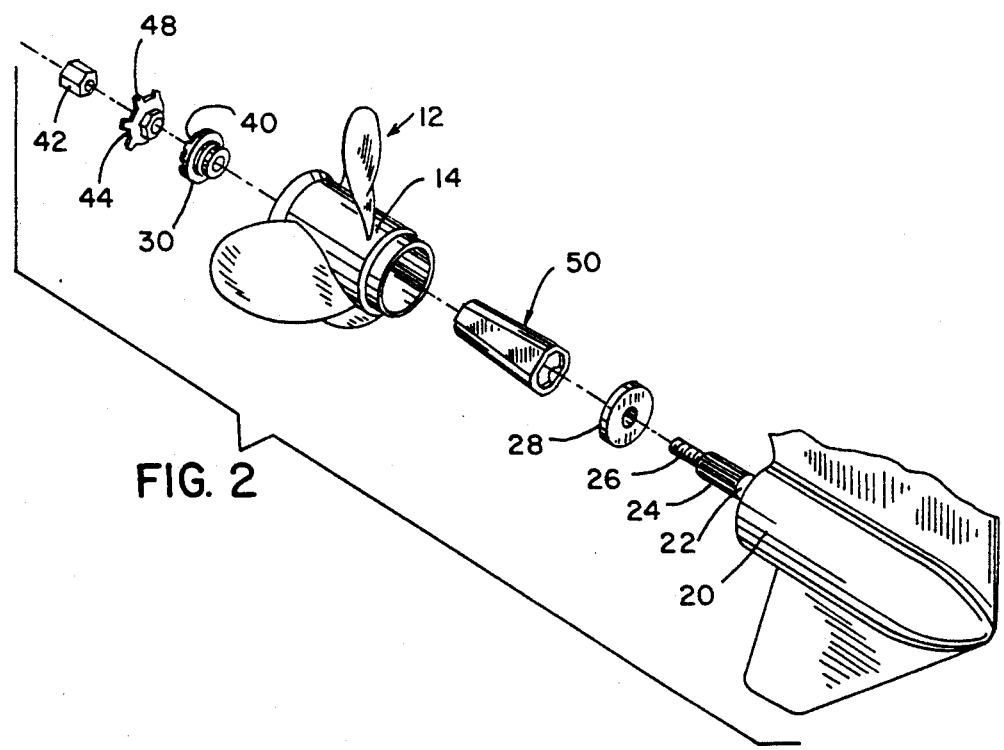

PROPELLER DRIVE SLEEVE

TECHNICAL FIELD

The invention relates to marine drives, and more particularly to a shock absorbing drive sleeve mounting the propeller to the propeller shaft.

BACKGROUND

Various mounting structures are known in the prior art for mounting the propeller to the propeller shaft and absorbing shock when the propeller strikes an object, to protect the propeller shaft and the drive.

Conover U.S. Pat. No. 2,125,270 shows a cup-shaped annulus 10 keyed to propeller shaft 4 by shear pin 11 and having an outer rubber block 15 engaging the propeller hub and absorbing shock.

Yantis U.S. Pat. No. 2,164,485 shows a shear pin 28, and rubber shock absorbing drive sleeve 18, FIG. 2, sleeve 36, FIG. 6, sleeve 44, FIG. 10, and sleeve 60, FIG. 13.

Hartz U.S. Pat. No. 2,633,923 shows a helical spring clutch element carried by the propeller shaft in radial frictional engagement with the hub and disposed so that engagement is relaxed upon overload when the propeller strikes an underwater object.

Stewart U.S. Pat. No. 3,230,739 shows a slip clutch with a cylindrical shaped flexible elastomeric member 28.

Marconi, Jr. U.S. Pat. No. 3,321,024 shows a resilient rubber or the like bushing 46, wherein slippage may occur between shank 36 and bushing 46 and between bushing 46 and aperture 18.

Schiek U.S. Pat. No. 4,317,655 shows rubber shock hub 28.

Carmel U.S. Pat. No. 4,338,064 shows a clutch assembly with a pair of elastomeric cushions 32.

Fishbaugh et al U.S. Pat. No. 4,452,591 shows rubber member 17 between inner rotary member 14 and propeller hub 13.

Costabile et al U.S. Pat. No. 4,566,855 shows a three piece break-away blade propeller. The break-away blade will break free of the blade support sections if the propeller blade strikes an obstacle. Costabile et al also shows in FIGS. 9-12 a resilient shock mount sleeve 92.

Frazzell et al U.S. Pat. No. 4,642,057 shows a cushion member 16 between sleeve member 14 and propeller hub 17.

Karls U.S. Pat. No. 5,022,875 shows rubber torsional shock dampening member 38 providing limited slip and preventing propeller breakage upon striking underwater objects.

SUMMARY OF THE INVENTION

The present invention provides mounting structure for mounting a propeller to a propeller shaft with reduced part content and substantially reduced cost. In the preferred embodiment, a semi-rigid drive sleeve, such as plastic or the like, has an inner diameter keyed to the propeller shaft and an outer diameter keyed to the propeller hub. The drive sleeve simply slides into the propeller hub, and the propeller hub and sleeve slides onto the propeller shaft. The structure is locked in place with standard forward and aft thrust washers and a propeller nut. The plastic drive sleeve on the propeller shaft provides protection against corrosion, as opposed to prior rubber cushions which require a brass member engaging the stainless steel propeller shaft, which in turn increases cost, and as opposed to prior aluminum hubs which creep and freeze on the propeller shaft.

In one aspect, the present invention reduces part content, including elimination of brass members and rubber inserts.

In another aspect, the invention enables ease of assembly, wherein the drive sleeve is merely slid into the propeller hub. In contrast, prior rubber inserts must be pressed in.

In another aspect, the drive sleeve can be easily replaced when it fails. The operator need not return to a propeller repair station.

In another aspect, the invention eliminates the need for bonded interfaces, such as rubber to brass.

In another aspect, the invention prevents premature hub slippage failure because the hub is mechanically locked to the propeller shaft. In the preferred embodiment, splines must shear before slippage can occur.

In another aspect, the invention enables the shear splines to be molded in, in contrast to brass hub inserts which must be broached.

In another aspect, the invention enables weight reduction due to the lighter plastic drive sleeve versus a rubber sleeve and brass insert.

In another aspect, the invention withstands higher temperatures then prior rubber sleeves. This is desirable in through-hub-exhaust systems where the high exhaust temperatures passing through the propeller hub cause rubber hub failures.

In the preferred failure mode, there is initial torsional twisting of the plastic drive sleeve, followed by shearing of the plastic molded splines thereof. The torsional twisting and limited resiliency of the plastic member provide some cushion before failure, which is desirable. The shear force is readily set by the axial length of the plastic splines.

In another aspect, the drive sleeve is provided with a first inner diameter portion keyed to and engaging the propeller shaft, and second inner diameter portion axially spaced from the first inner diameter portion and spaced radially outwardly of and disengaged from the propeller shaft. The drive sleeve has an annular thickness which tapers from its thickest dimension at the first inner diameter portion to its thinnest dimension at the second inner diameter portion.

In another aspect, the drive sleeve has a first outer diameter portion aligned with the first inner diameter portion, and a second outer diameter portion aligned with the second inner diameter portion. The drive sleeve and propeller hub are tapered relative to each other such that the second outer diameter portion snugly engages the propeller hub, and the first outer diameter portion is spaced from the hub by a slight gap and may at least partially rotate relative to the propeller hub in response to rotation of the propeller shaft. When the propeller strikes an object, the shock is absorbed by torsional twisting of the drive sleeve wherein the first inner diameter portion and the first outer diameter portion continue to rotate to a slightly further rotated position than the second outer diameter portion.

BRIEF DESCRIPTION OF THE DRAWINGS

FIG. 1 shows a marine drive.

FIG. 2 shows an exploded perspective view of a portion of FIG. 1, and illustrates propeller mounting structure in accordance with the invention.

FIG. 3 is a perspective view partially cut away of the drive sleeve of FIG. 2.

DETAILED DESCRIPTION

Figure 4:
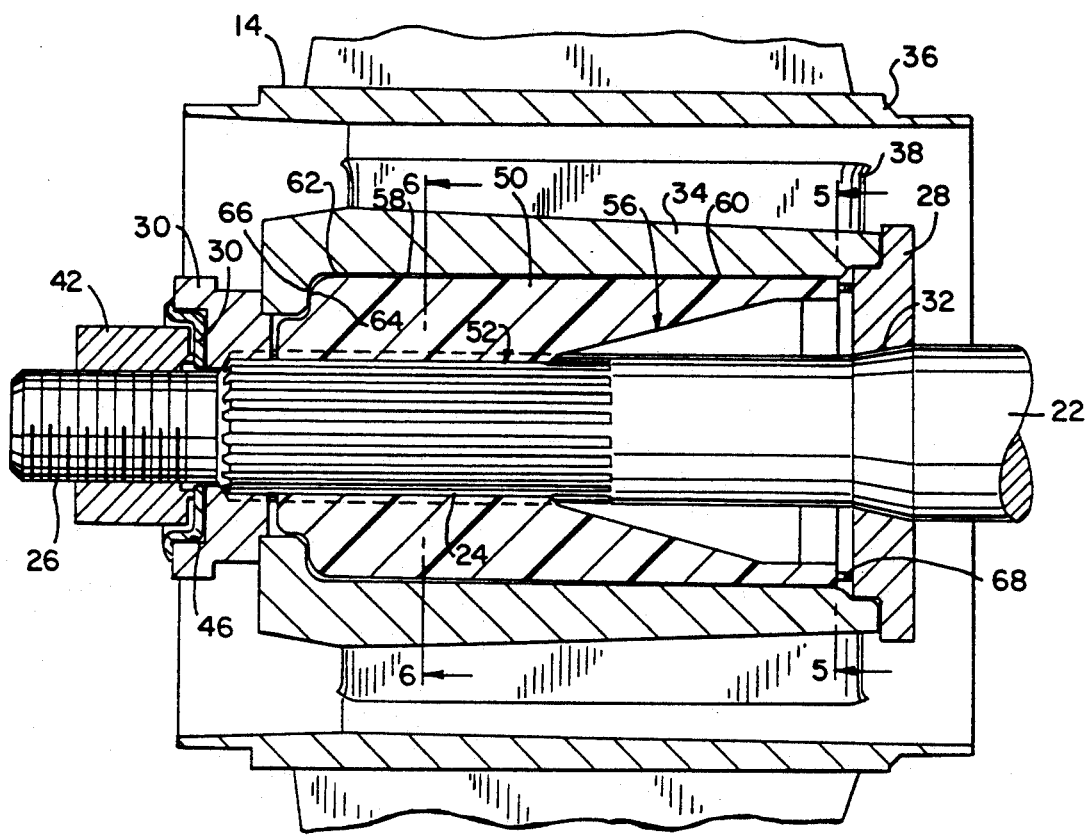
FIG. 4 is a cross sectional view of a portion of the structure of FIG. 2 in assembled condition.

FIG. 1 shows a marine drive 10 having a propeller 12 with a propeller hub 14. The marine drive includes a driveshaft housing 16 with a lower gearcase 18 and torpedo housing 20. Propeller shaft 22, FIG. 2, extends rearwardly from torpedo housing 20 and has a splined portion 24 and a rear threaded portion 26. Propeller hub 14 is mounted to splined portion 24 between front and rear thrust hubs or washers 28 and 30, as in above noted U.S. Pat. No. 5,022,875, incorporated herein by reference. Front thrust washer 28 bears against tapered transition portion 32, FIG. 4, of the propeller shaft. Hub 14 has an inner hub portion 34 connected to outer hub portion 36 by a plurality of radial spokes such as 38. The forward end of inner hub portion 34 bears against thrust washer 28. Rear thrust washer 30 is internally splined and received on portion 24 of the propeller shaft and engages the rear end of inner propeller hub portion 34 to mount the propeller hub to the propeller shaft. Rear thrust washer 30 has a plurality of outer slots 40, FIG. 2, spaced circumferentially around propeller shaft 22. A nut 42 is threaded onto rear threaded portion 26 of the propeller shaft. A locking tab washer 44 is around the propeller shaft between nut 42 and rear thrust washer 30. Locking tab washer 44 has an inner hex configured surface 46, FIG. 4, recessed forwardly and receiving hex nut 42 therein and preventing rotation of nut 42 relative to locking tab washer 44. Locking tab washer 44 has a plurality of tabs 48 extending radially outwardly therefrom and bendable forwardly into slots 40 to prevent rotation of locking tab washer 44 relative to rear thrust washer 30 which in turn is prevented from rotating relative to propeller shaft 22 by the noted splined mounting thereto at portion 24. For further reference relative to the mounting structure thus far described, reference is made to incorporated U.S. Pat. No. 5,022,875.

Propeller hub 14 is mounted to propeller shaft 20 at splined portion 24 by drive sleeve 50, FIGS. 2-4. Drive sleeve 50 is a semi-rigid member of limited torsional twisting capability. In the preferred embodiment, drive sleeve 50 is a molded member of a plastic material such as DuPont Delrin 150. Drive sleeve 50 has a rearward inner diameter portion 52 keyed to and engaging the propeller shaft in driven relation. It is preferred that inner diameter portion 52 have a plurality of molded-in splines or teeth 54 engaging the propeller shaft in splined driven relation at splined portion 24. Drive sleeve 50 has a forward inner diameter portion 56 axially spaced forwardly from inner diameter portion 52 and spaced radially outwardly of and disengaged from propeller shaft 22, FIG. 4. Forward inner diameter portion 56 is axially tapered, FIG. 4, to increasing radial separation from propeller shaft 22 with increasing axial distance from rearward inner diameter portion 52. Drive sleeve 50 has an annular thickness which is largest at rearward inner diameter portion 52, and which annular thickness decreases along forward inner diameter portion 56 with increasing axial distance from rearward inner diameter portion 52. The minimum annular thickness of the drive sleeve is at the forward axial end of forward inner diameter section 56 spaced axially farthest from rearward inner diameter section 52.

Drive sleeve 50 has a rearward outer diameter portion 58 radially aligned with rearward inner diameter portion 52. Drive sleeve 50 has a forward outer diameter portion 60 radially aligned with forward inner diameter portion 56 and axially spaced forwardly from inner diameter portion 52 and outer diameter portion 58.

Figure 5:
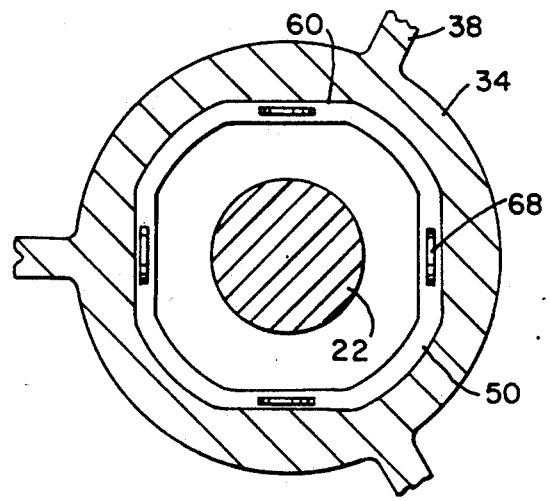
FIG. 5 is a sectional view taken along line 5—5 of FIG. 4.

The outer diameter of drive sleeve 50 is tapered to have a larger outer diameter at forward portion 60 than at rearward portion 58. Forward outer diameter portion 60 snugly engages the propeller hub at portion 34 in keyed relation, such as by providing a polygonal shape to each, FIG. 5. Rearward outer diameter portion 58 is spaced slightly radially inwardly of propeller hub portion 34 by a small gap 62 such that rearward outer diameter portion 58 of the drive sleeve may partially rotate relative to the propeller hub in response to rotation of the propeller shaft drivingly engaging inner diameter portion 52.

Figure 6:
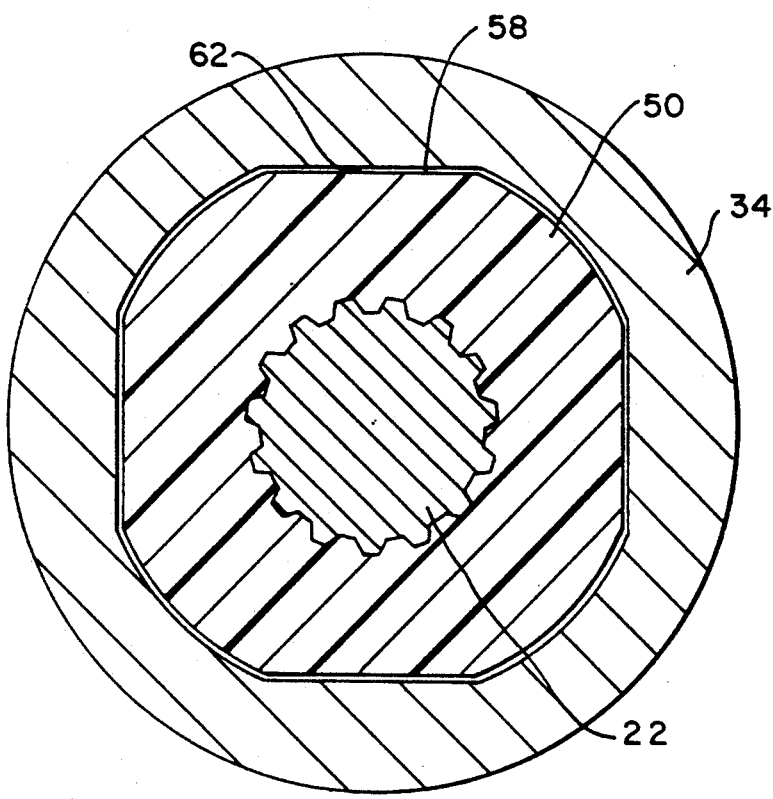
FIG. 6 is a sectional view taken along line 6—6 of FIG. 4.
Figure 7:
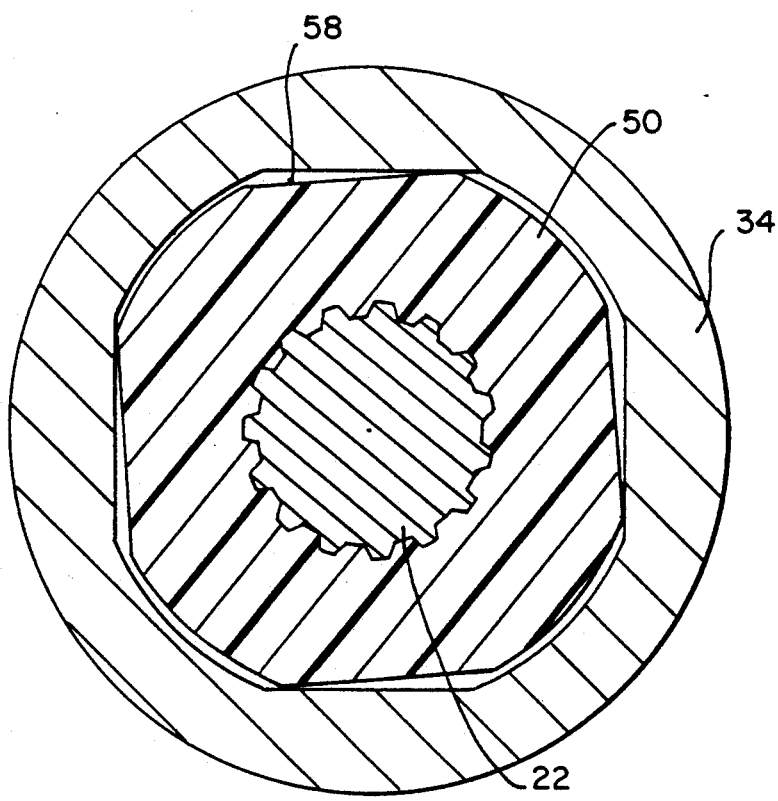
FIG. 7 is a view like FIG. 6 and shows a further rotated position.

When the propeller strikes an object, the shock is absorbed by torsional twisting of drive sleeve 50 wherein rearward inner diameter portion 52 and rearward outer diameter portion 58 continue to rotate to a further rotated position, FIG. 7, than the position of forward outer diameter portion 60, whereafter splines 54 of the drive sleeve shear. FIG. 6 shows the normal position of rearward outer diameter portion 58 of drive sleeve 50 relative to propeller hub portion 34. When the propeller strikes an object, portion 58 continues to rotate to the further rotated position shown in FIG. 7. It is preferred that the further rotated position of rearward inner diameter portion 52 and rearward outer diameter portion 58 be about 5° beyond the position of the forward outer diameter portion 60. The torsional twisting of the drive sleeve followed by shearing of splines of teeth 54 protects the propeller shaft and the drive. The magnitude of the shear force is set by the axial extent of splines 54 of the drive sleeve. The torsional twisting deformation of the drive sleeve absorbs shock when the propeller strikes an object.

During assembly, drive sleeve 50 is slid rearwardly into the propeller until its rearward shoulder 64 is stopped against shoulder 66 of propeller hub portion 34. The hub is then slid forwardly onto the propeller shaft until the forward end of hub portion 34 engages forward thrust washer 28. Rearward thrust washer 30, locking tab washer 44 and nut 42 are then assembled and torqued down. Forward molded spacing bumps 68 on drive sleeve 50 are compressed during torquing down of nut 42 and provide tolerance compensation.

It is recognized that various equivalents, alternatives and modifications are possible within the scope of the appended claims.

We claim:

1. In a marine drive comprising a propeller with a hub, and an axially extending propeller shaft, a shock absorbing drive sleeve mounting said propeller hub to said propeller shaft and comprising an inner diameter portion keyed to and engaging said propeller shaft in driven relation, a first outer diameter portion radially aligned with said inner diameter portion, a second outer diameter portion axially spaced from said inner diameter portion and said first outer diameter portion and keyed to and engaging said propeller hub in driving relation, wherein said drive sleeve and said propeller hub are tapered relative to each other such that said second outer diameter portion snugly engages said propeller hub, and said first outer diameter portion may at least partially rotate relative to said propeller hub in response to rotation of said propeller shaft drivingly engaging said inner diameter portion, such that when said propeller strikes an object, the shock is absorbed by torsional twisting of said drive sleeve wherein said inner diameter portion and said first outer diameter portion continue to rotate to a further rotated position than said second outer diameter portion.

2. The invention according to claim 1 wherein said propeller shaft and said inner diameter portion of said drive sleeve have splines and engage in splined driving relation, and wherein said inner diameter portion and said first outer diameter portion rotate to said further rotated position relative to said second outer diameter portion, whereafter the splines of said drive sleeve shear.

3. The invention according to claim 2 wherein said further rotated position of said inner diameter portion and said first outer diameter portion is about five degrees beyond the position of said second outer diameter portion.

4. In a marine drive comprising a propeller with a hub, and an axially extending propeller shaft, a shock absorbing drive sleeve mounting said propeller hub to said propeller shaft and comprising an inner diameter portion keyed to and engaging said propeller shaft in driven relation, a first outer diameter portion radially aligned with said inner diameter portion, a second outer diameter portion axially spaced from said inner diameter portion and said first outer diameter portion and keyed to and engaging said propeller hub in driving relation, wherein said drive sleeve and said propeller hub are tapered relative to each other such that said second outer diameter portion snugly engages said propeller hub, and said first outer diameter portion may at least partially rotate relative to said propeller hub in response to rotation of said propeller shaft drivingly engaging said inner diameter portion, such that when said propeller strikes an object, the shock is absorbed by torsional twisting of said drive sleeve wherein said inner diameter portion and said first outer diameter portion continue to rotate to a further rotated position than said second outer diameter portion, and wherein said inner diameter portion includes at least one shearable tooth keyed to and engaging said propeller shaft in driven relation, and said inner diameter portion and said first outer diameter portion rotate to said further rotated position relative to said second outer diameter portion, whereafter said tooth shears.

5. The invention according to claim 4 wherein said drive sleeve is plastic.

6. The invention according to claim 4 wherein said drive sleeve is a single integrally molded member directly engaging said propeller hub at said outer diameter portion, and directly engaging said propeller shaft at said inner diameter portion without an intermediate member therebetween.

* * * * *